United States Patent
Narita

[19]

[11] Patent Number: 5,818,203
[45] Date of Patent: Oct. 6, 1998

[54] POWER SUPPLY UNIT AND AN ELECTRONIC APPARATUS HAVING SAME

[75] Inventor: Izuru Narita, Kanagawa-ken, Japan

[73] Assignee: International Business Machines Corporation, Armonk, N.Y.

[21] Appl. No.: 926,931

[22] Filed: Sep. 10, 1997

[30] Foreign Application Priority Data

Dec. 18, 1996 [JP] Japan .................................. 8-337834

[51] Int. Cl.[6] ............................................. H01M 10/46
[52] U.S. Cl. ........................................................ 320/128
[58] Field of Search .................................. 320/121, 122, 320/126, 128, 135, 138, 150, 153, 160, 163, 133, 113, 155, DIG. 31; 307/18, 19, 44, 46, 66

[56] References Cited

U.S. PATENT DOCUMENTS

| | | | |
|---|---|---|---|
| 5,028,860 | 7/1991 | Amano ...................................... | 320/164 |
| 5,541,490 | 7/1996 | Sengupta et al. ........................ | 320/160 |
| 5,557,738 | 9/1996 | Townsley et al. ...................... | 307/66 X |
| 5,563,493 | 10/1996 | Matsuda et al. ......................... | 320/124 |
| 5,572,110 | 11/1996 | Dunstan .................................... | 320/106 |
| 5,583,417 | 12/1996 | Yuen ........................................ | 320/160 |
| 5,721,481 | 2/1998 | Narita et al. ............................. | 307/66 X |

*Primary Examiner*—Edward Tso
*Attorney, Agent, or Firm*—Anthony N. Magistrale

[57] ABSTRACT

Disclosed is an electronic apparatus which includes a power supply unit and a constant voltage rechargeable battery. The power supply unit activates a dedicated charging circuit, which is located near the battery, only at the charging end stage after the terminal voltage of the battery has attained a predetermined value, and provides constant voltage control for a charge current by using the charging circuit. The charging circuit, however, is not employed at the initial charging stage, where precise constant voltage control is not required. The output current, for which constant current control is performed by the AC adaptor, is employed unchanged as a charge current, with which quick charging is performed. That is, since a transformer in the charging circuit is not activated at the initial charging stage, a power loss, which accompanies the operation of the transformer, and heat generation and the occurrence of magnetic noise in the electronic apparatus can be reduced to a minimum.

14 Claims, 3 Drawing Sheets

POWER SUPPLY UNIT AND AN ELECTRONIC APPARATUS HAVING SAME

FIELD OF THE INVENTION

The present invention relates to a power supply unit for an electronic apparatus, and in particular to a power supply unit for a battery-operated electronic apparatus, such as a notebook computer. More specifically, the present invention pertains to a power supply unit that ha, a built-in battery charging function, and that is employed for an electronic apparatus for which a rechargeable battery, such as a lithium ion cell, is provided.

BACKGROUND OF THE INVENTION

In accordance with recent developments in technique, various types of personal computers ("PCs"), such as desktop, tower and notebook types, are being produced and being sold on the market. The light, compact notebook PCs are designed and produced while taking into consideration their suitability for use in mobile environments, i.e., their portability and adequacy for outdoor use.

A notebook PC is generally a "battery-operated type" that can be driven by an incorporated battery. This is because a notebook PC is so designed that it can be used in a place, such as outdoors or at a destination on a business trip, where a commercially available power source may not be available. The incorporated battery is a "battery pack," consisting of a package containing a plurality of cells. Rechargeable batteries, such as Li-Ion batteries or NiMH batteries, are used for the battery cells. Although aqueous solvent rechargeable batteries, such as NiCd (nickel cadmium) cells or NiMH (nickel-metal hydride) cells, have mainly been used, recently, non-aqueous solvent rechargeable batteries, such as Li-Ion (lithium ion) cells that are superior in volume energy density and weight energy density, tend to be employed.

FIG. 3 is a schematic diagram illustrating a conventional power supply unit for a battery operated computer system. As is shown in FIG. 3, a computer system (system load) 100 has, as primary power sources, a commercially available alternate current (AC) power source that supplies power to an AC adaptor 10, and a battery pack 20 that is retained in the system 100. The output terminals of the AC adaptor 10 and the battery pack 20 are connected in parallel to a DC/DC converter 30. To prevent a current backflow between the power sources 10 and 20, the power sources 10 and 20 are OR connected by two diodes 12 and 13.

The AC adaptor 10, which is a device for transforming into a DC voltage an AC voltage provided by a commercially available power source outside the system 100, has an internally provided transformer (not shown). The output of the AC adaptor 10 generally has a constant voltage (CV) output characteristic. The DC/DC converter 30 is a device for reducing a DC voltage that is supplied by the AC adaptor 10 or by the battery pack 20 to a level appropriate for system operation, and for supplying the altered voltage to satisfy the requirements of respective system loads. The DC/DC converter 30 also has an internally provided transformer (not shown). The system loads include various controller chips, such as a CPU, a main memory and a video controller, and peripheral devices, such as a hard disk drive (HDD), a floppy disk drive (FDD) and a CD-ROM drive.

The battery pack 20 is exchangeably installed into a battery room (not shown) that is provided in one part of the system 100. The AC adaptor 10 is detachably connected to the system 100 by a power jack 11. The battery pack 20 is a package consisting of a plurality of battery cells, and has an operating capacity of only two or three hours. On the other, hand, as is well known, the commercially available power source has no capacity limit. Therefore, when the AC adaptor 10, i.e., the commercially available power source, is connected to the system 100, power from the commercially available power source is given priority in supplying power to the system 100. When the AC adaptor 10 is removed in a mobile environment, a current supplied by the battery pack 20 is employed for operation of the system 100.

In general, rechargeable batteries are used for the battery pack 20. A dedicated device, called a charger, can be assigned the function of charging the battery pack 20. Actually, an optional charging unit that is separate from the main body is provided for many battery operated devices, such as video cameras and portable telephones. Most of the latest notebook PCs, however, include an internal charging function because usability is ensured by eliminating the requirement for carrying an optional component, a charging circuit, and by simplifying the charging operation.

In FIG. 3, a charging circuit 40 is connected in series to the output terminal of the battery pack 20. In this case, when more power is supplied via the adaptor 10 than is required to operate the system 100, the excess power is used for charging the battery. The charging circuit 40, for which a transformer (not shown) is internally provided, transforms the power from the AC adaptor 10 into a type that conforms with the battery charging characteristic. Since it is optimal for aqueous solvent storage batteries, such as NiCd (nickel cadmium) or NiMH (nickel-metal hydride) cells, to be charged in a constant current (CC) area that borders on the rated battery input current that can be permitted by a battery cell, the charging circuit 40 exercises constant current feedback; control for the constant voltage output by the AC adaptor 10, so that the battery is efficiently charged without an overcurrent inflow occurring. The charging circuit 40 also has a trickle charge function to recover an over-discharged battery to the initial charging state.

The charging circuit 40 in the system 100 is controlled by a dedicated power controller 50. When the power controller 50 detects the charge start time for the battery pack 20, a control signal "Charge" is asserted to activate the charging circuit 40. Accordingly, power output via the AC adaptor 10 is supplied to the battery pack 20 via the charging circuit 40. When the power controller 50 detects a charging end time, a control signal "Charge" is negated to halt the operation of the charging circuit 40. As a result, the route of the power supply through the charging circuit 40 is cut off, and no current flows between the AC adaptor 10 and the battery pack 20 when they are OR-connected by the diodes 12 and 13.

A power supply unit for a notebook PC having a charging function is disclosed in the specification for U.S. Pat. No. 5,465,039 (Attorney Docket No. JA9-92-029), owned by the assignee of the present invention and incorporated herein by reference. In the '039 patent, a notebook PC does not incorporate a charging circuit, but instead, an attached AC adaptor has a charging function. More specifically, the AC adaptor provides constant voltage feedback control during system operation, while the output terminal voltage of the AC adaptor is equal to or higher than a predetermined value. When the charging of the battery pack 20 is begun and the output terminal voltage is lower than the predetermined value, the constant voltage feedback control is switched to the constant wattage feedback control or the constant current feedback control to prevent an excessive charging current from flowing into the battery pack 20. As a result, a constant current rechargeable battery, such as a NiCd cell or a NiMH cell, can be charged directly using the output of the AC adaptor.

According to U.S. Pat. 5,465,039, both a constant voltage output characteristic, which is required for system operation, and a constant wattage/constant current output characteristic, which is required for the charging of a battery, can be provided by a single transformer in an AC adaptor. Generally, a conversion loss, i.e., a power loss, occurs each time a current is passed through a transformer, this power loss being changed into heat energy and magnetic coil energy. According to U.S. Pat. No. 5,465,039, described above, since only the transformer in the AC adaptor is employed, the power loss can be reduced to a minimum. Further, as a charging circuit, i.e., a transformer, is not provided within the PC body, a savings in the volume of the PC body can be achieved, and heat generation and magnetic noise, which should be taken into consideration when designing a PC, can be eliminated.

As previously described, the constant current system is deemed to be optimal for charging NiCd or NiMH batteries. Since the temperature in a battery cell rises as the charging capacity is increased, the charging end time can be determined by measuring the temperature of the battery cell (well known).

On the other hand, a non-aqueous solvent battery, such as a lithium ion cell, has a charging characteristic that differs from that of NiCd or NiMH. Referring to FIG. 4, there is shown the charge characteristic (change in a battery voltage and an input current) of a lithium ion battery when it is charged using the constant current/constant voltage charging system. At the initial charging stage, where a battery voltage has not reached a predetermined value, generally, the charging is performed by a charge current that borders on the rated current. On the other hand, at the charging end stage, where the battery voltage has attained a predetermined value, the charge current is gradually reduced so that the battery voltage does not exceed the predetermined value.

When battery voltage is too high, the lithium ion battery may explode or ignite due to the generation of internal heat and the generation of gas under pressure. Therefore, although quick charging of a lithium ion battery is possible by supplying a rated charge current or lower at the initial charging stage, where the charging capacity is relatively low, the charging must be controlled precisely, so that there is no excessive increase in the battery voltage at the charging ending stage, where the battery voltage equals a predetermined value (see FIG. 4). For a battery pack consisting of three lithium ion battery cells connected in series, for example, the charging voltage must be controlled within a range extending to 12.75±0.06 [V].

The power supply unit, i.e., the AC adaptor, in U.S. Pat. No. 5,465,039 is suitable for NiCd and NiMH batteries for which a relatively rough constant voltage control is permitted. However, since the output terminals of the AC adaptor 10 and the battery pack 20 are connected by a rather long power line, the constant voltage output of the AC adaptor 10 may fluctuate during the course of the transfer. Therefore, to exercise precise constant voltage control, no method exists except one that provides for a dedicated charging circuit 40 to be additionally arranged near the terminal of the battery pack 20, as is shown in FIG. 3.

The additional charging circuit 40 accordingly causes a power loss. In addition, since this circuit 40 is provided inside the PC body, problems of heat generation and magnetic noise in the PC body arise, and the area where the other components are to be mounted will be reduced.

It is therefore desirable to provide for an electronic apparatus that can employ a constant voltage rechargeable battery, a power supply unit that can reduce power loss, and the heat and magnetic noise generated in the electronic apparatus.

SUMMARY OF THE INVENTION

For a constant voltage rechargeable battery, such as a lithium ion battery, constant voltage control is not required at the initial stage, while highly accurate constant voltage control must be provided at the charging end stage. Since at the charging end stage for the lithium ion battery, accurate constant voltage control is required for a charge current, a dedicated charging circuit provided near the battery must be employed. On the other hand, at the initial charging stage, the accurate constant voltage control is not required for a charge voltage. At the initial stage, therefore, it is better not to use the charging circuit, so that the output of the AC adaptor can be supplied to the battery with no power loss.

The power supply unit of the present invention activates a dedicated charging circuit located near a lithium ion battery only at the charging end stage, after the terminal voltage of the battery has attained a predetermined value, and provides constant voltage control for a charging current by using the charging circuit. The charging circuit, however, is not employed at the initial charging stage where precise constant voltage control is not required, and the output current, for which the constant current control or constant wattage control is performed by the AC adaptor, is employed as a charge current, with which quick charging is performed.

According to the power supply unit of the present invention, a charging circuit is not used at the initial charging stage. That is, since a transformer in the charging circuit is not activated at the initial charging stage, power loss, which accompanies the operation of the transformer, and heat generation and the occurrence of magnetic noise in the electronic apparatus can be reduced to the minimum.

With the power supply unit according to the present invention, since a charging circuit is not employed al: the initial charging stage, and accordingly, no power loss accompanies the operation of a transformer, a greater charge current can be supplied to the battery. As a result, the total time required for charging the battery can be reduced.

Other objects, features, and advantages of the present invention will become apparent during the course of the detailed description of the embodiments of the present invention, which will be given while referring to the accompanying drawings.

DETAILED DESCRIPTION OF THE INVENTION

Figure 1:
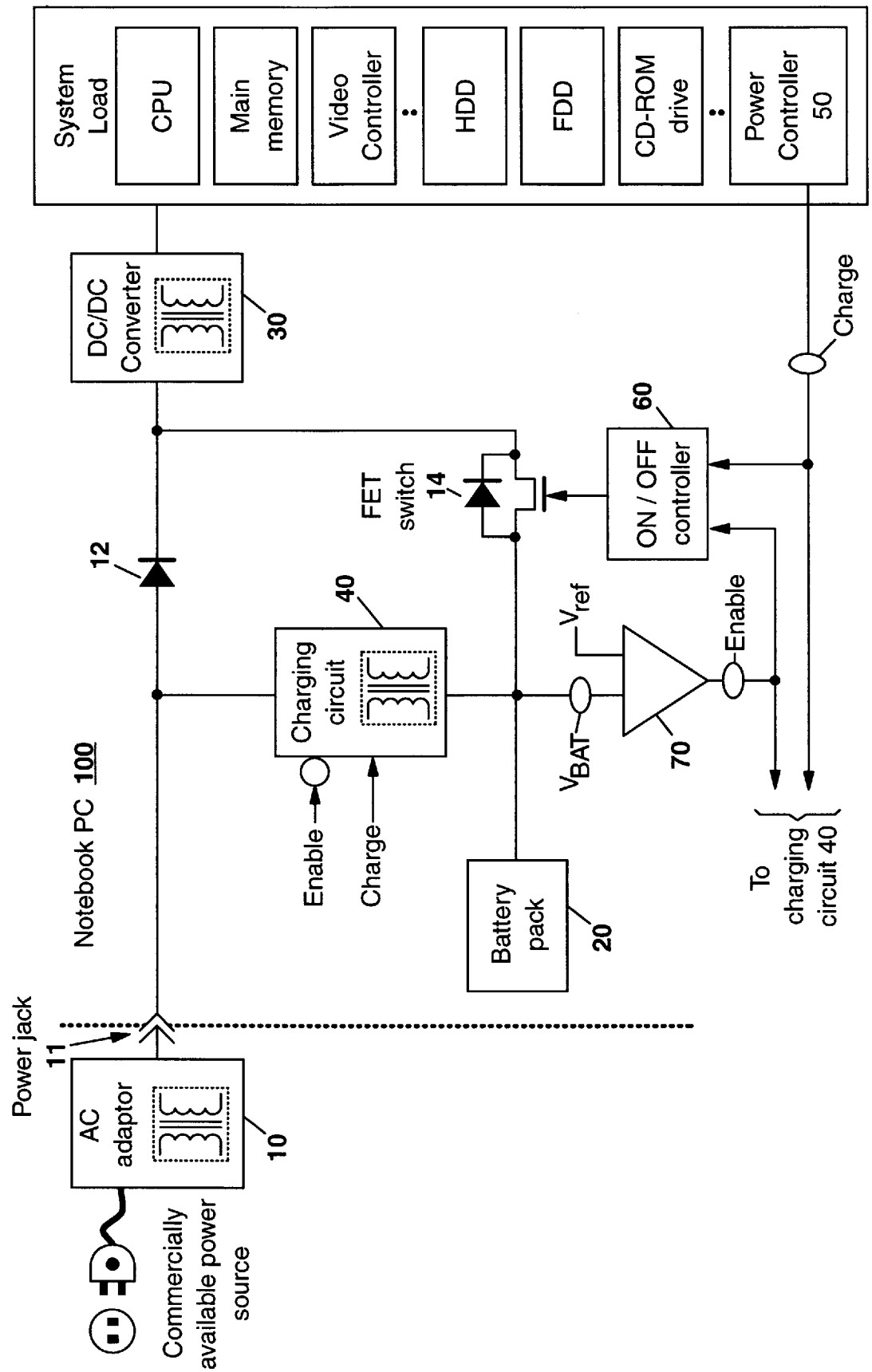
FIG. 1 is a schematic diagram illustrating a power supply unit in a battery operated computer system according to the present invention.

FIG. 1 is a schematic diagram illustrating a power supply unit in a battery-operated computer system according to the present invention. As is shown in FIG. 1, a computer system (system load) 100 has two main power sources: a commercially available alternating current (AC) power source provided via an AC adaptor 10, and a battery pack 20 mounted in the system 100. The output terminals of the AC adaptor 10 and the battery pack 20 are connected in parallel to a DC/DC converter 30.

The AC adaptor 10, which includes a transformer (not shown), is a device for transforming an AC voltage provided by the commercially available power source into a DC voltage. The AC adaptor 10 in this embodiment has constant voltage (CV), constant wattage (CW), and constant current (CC) output characteristics. As long as the output terminal voltage of the AC adaptor 10 is equal to or higher than a predetermined value during the operation of the system 100, constant voltage feedback control is performed. When the charging of the battery pack 20 is begun, and the output terminal voltage becomes lower than the predetermined value during the operation of the system 100, the control operation is switched to the constant wattage feedback control to prevent an excessive charge current from flowing in the battery pack 20. When the operation of the system 100 is halted (when the system 100 is set to the normal power OFF state, or when it is set in a low power consumption mode, such as a "suspend" mode), the control operation is switched to the constant current feedback control to enable quick charging of the battery pack 20 (see U.S. Pat. No. 5,465,039 for details of the operation of the AC adaptor 10). It should be noted that the AC adaptor 10 is detachably connected to the system 100 at a power jack 11.

The battery pack 20 is exchangeably accommodated into a battery room (not shown) that is provided in one part of the system 100. The battery pack 20 is a package consisting of a plurality of battery cells. A battery cell in this embodiment is one of the type to which constant voltage charging after constant current charging is appropriate (e.g., a lithium ion battery). The total capacity of the battery pack 20 is enough only for two to three hours of operation of the system 100. Therefore, when the AC adaptor 10, i.e., the commercially available power source, is connected to the power jack 11, the infinite power supplied via the AC adaptor 10 is first employed for system operation. When the AC adaptor 10 is removed from the jack 11 in a mobile environment, a current provided by the battery pack 20 is employed for system operation.

The DC/DC converter 30, for which a transformer (not shown) is internally provided, is a device for reducing a DC voltage provided via the AC adaptor 10 or by the battery pack 20 to a level appropriate for system operation. The output voltage of the DC/DC converter 30, which is reduced and stabilized, is supplied to the respective system loads. The system loads include various controller chips, such as a CPU, a main memory and a video controller, and peripheral devices, such as a hard disk drive (HDD), a floppy disk drive (FDD) and a CD-ROM drive. Since these hardware blocks are not directly related to the subject of the present invention, no further explanation for them will be given.

As is shown in FIG. 1, the output terminals of the AC adaptor 10 and the battery pack 20 are connected in parallel by a first current route, into which a diode 12 and a FET switch 14 are inserted, and a second current route, into which a charging circuit 40 is inserted. Since the cathodes of the diode 12 and of the parasite diode of the FET switch 14 are OR connected, no current flows along the first current route when the FET switch 14 is OFF.

A power controller 50 is one of the peripheral controller chips, and is provided mainly to manage the power supply to the respective sections in the system 100. An example power controller 50 is the one-chip IC "300/H8" produced by Hitachi, Ltd. An IC of this type includes a 16-bit CPU, RAM, ROM, a timer, eight analog input pins and 16 digital input/output pins, and is programmable. In this embodiment, the power controller 50 is programmed to monitor the remaining capacity of the battery pack 20, and when it detects a reduction in the remaining capacity (i.e., a low battery state), it transmits a "Charge" signal to instruct the beginning of the charging operation.

An operational amplifier 70 monitors the output terminal voltage of the battery pack 20. The operational amplifier 70 receives a battery terminal voltage $V_{BAT}$, extracted at point P along the second current route, and a given reference voltage $V_{ref}$, and supplies an "Enable" signal to the charging circuit 40 and an ON/OFF controller 60. As long as $V_{BAT}$ does not exceed $V_{ref}$, the "Enable" output of the operational amplifier 70 is asserted. When $V_{BAT}$ exceeds $V_{ref}$, the "Enable" output is negated.

The charging circuit 40, for which a transformer (not shown) is internally provided, has a highly accurate constant voltage control function (e.g., the function for setting the output voltage to 12.75±0.06 V). The input terminal of the charging circuit 40 is connected to the AC adaptor 10, and the output terminal is connected to the battery pack 20. The start and end periods for the operation of the charging circuit 40 are controlled by output signals from the power controller 50 and the operational amplifier 70. More specifically, the charging circuit 40 receives a non-inverted charging start instruction "Charge" from the power controller 50, and an inverted "Enable" output by the operational amplifier 70. Only when both inputs are in an asserted state is the charging circuit 40 activated. That is, only when the terminal voltage of the battery pack 20 attains the predetermined value $V_{ref}$ during a period that is assumed to be the charging period for the battery pack 20, is the charging circuit 40 activated. As a result, a charge current from the AC adaptor 10 passes along the second current route.

The FET switch 14 is provided for opening and closing the first current route. The ON/OFF operation of the FET 14 is controlled by the ON/OFF controller 60. The ON/OFF controller 60 receives a non-inverted charge start instruction "Charge" from the power controller 50 and a non-inverted "Enable" output from the operational amplifier 70, and supplies the logical product of the two inputs to the gate of the FET 14. Therefore, during a period that is assumed to be the charging period for the battery pack 20, and until the terminal voltage of the battery pack 20 attains the predetermined value $V_{ref}$, the FET 14 is in the ON state. When the FET 14 is ON, the charge current from the AC adaptor 10 can pass along the first current route.

An explanation has been given for the hardware arrangement of the power supply unit in the battery operated computer system according to the present invention. The charging operation for the battery pack 20 in the power supply unit along with the effect of the present invention will now be described. It should be noted that hereinafter it is assumed that the AC adaptor 10 is attached to the power jack 11 of the system 100, Although the AC adaptor 10 may also perform a constant wattage feedback when the system 100 is operating and is charging the battery pack 20 (see U.S. Pat. No. 5,465,039), to simplify the explanation, it is assumed that only a constant current feedback control is being performed.

Figure 2:
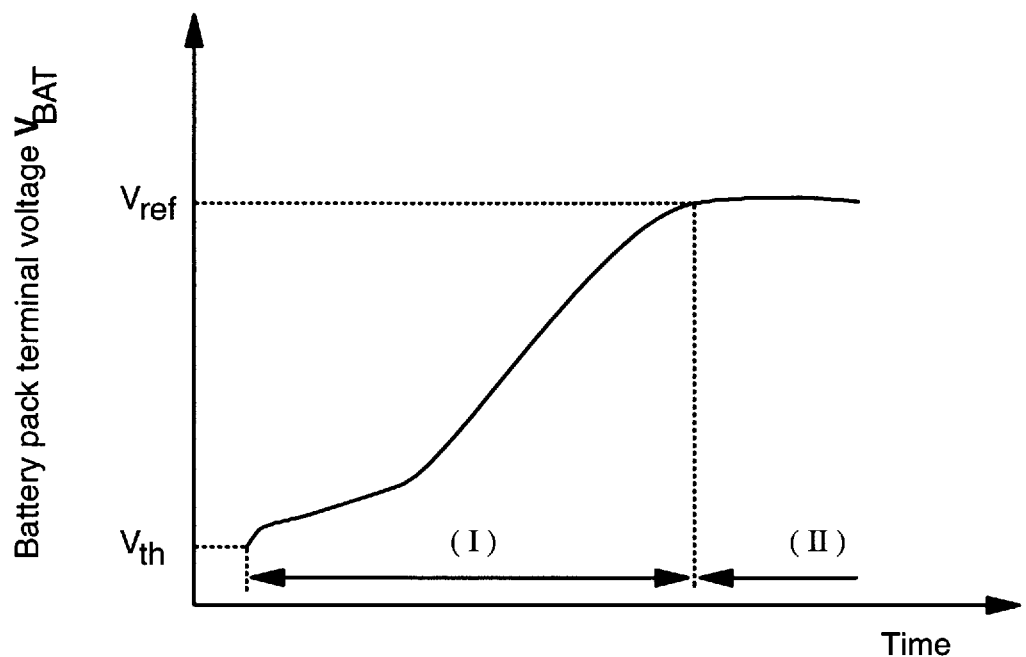
FIG. 2 is a graph showing a change in the terminal voltage $V_{BAT}$ of a battery pack 20 that is being charged by the power supply unit of the present invention.
Figure 4:
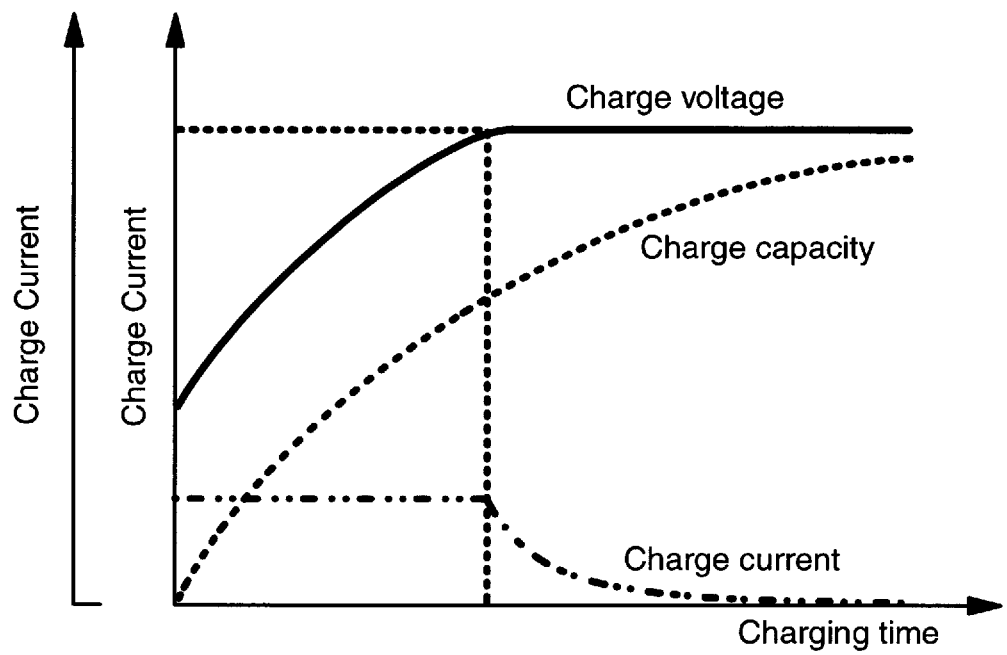
FIG. 4 is a graph showing the charging characteristic of a lithium ion battery that is being charged by a constant current-constant voltage system.
Figure 3:
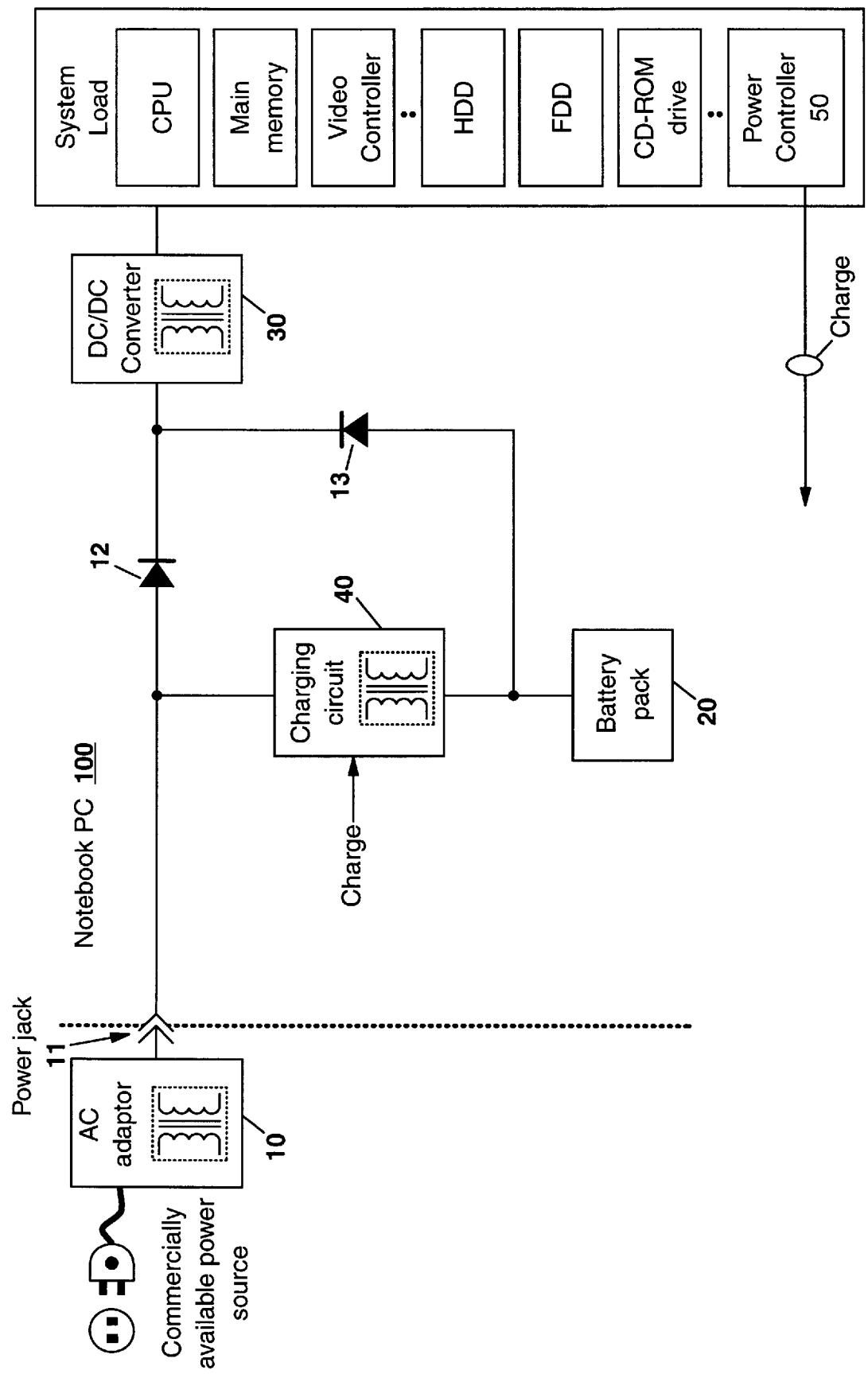
FIG. 3 is a schematic diagram illustrating a conventional power supply unit of a battery operated computer system.

In FIG. 2 is shown the transition in the terminal voltage $V_{BAT}$ of the battery pack 20 that is being charged by the power supply unit of the present invention, i.e., the charging characteristic of the battery pack 20.

If, because the terminal voltage $V_{BAT}$ of the battery pack 20 is smaller than a predetermined value $V_{th}$, the power controller 50 ascertains that charging should be initiated, control signal "Charge" is asserted. At this time, since the terminal voltage $V_{BAT}$ has not attained the reference voltage $V_{ref}$, the output signal "Enable" of the operational amplifier 70 is asserted. As a result, the FET switch 14 is turned on, and the charging circuit 40 is set to the non-activated state.

As the FET switch 14 is ON, the charge current from the AC adaptor 10 flows along the first current route to the battery pack 20. The terminal voltage of the AC adaptor 10 falls as does the terminal voltage $V_{BAT}$ of the battery pack 20, so that the AC adaptor 10 changes its operational characteristic from a constant voltage output to a constant current output. Since the battery pack 20 is in its initial charging stage, i.e., the terminal voltage $V_{BAT}$ is low, quick charging with a constant current is performed using the unchanged output of the AC adaptor 10. Accordingly, there is a relatively drastic increase in the terminal voltage $V_{BAT}$ (phase (I)).

During the period covered by phase (I), the charging circuit 40 is not activated, i.e., the transformer of the charging circuit 40 is not activated. As a result, there is neither a power loss, which accompanies a voltage transformation, nor the heat generation and magnetic noise that accompany a power loss.

When the terminal voltage $V_{BAT}$ is increased to the reference voltage $V_{ref}$, the output signal "Enable" of the operational amplifier 70 is negated. Then, the ON/OFF controller 60 turns off the FET switch 14, and the first current route is cut off. At the same time, the charging circuit 40 is activated, and a charge current from the AC adaptor 10 flows along the second current route to the battery pack 20. As a result, a charge current, for which constant voltage control is accurately performed by the charging circuit 40 (e.g., to 12.70±0.06 V), can be supplied to the battery pack 20 (phase (II)).

According to this embodiment, the operation of the charging circuit 40 provided in the system 100 can be limited to the phase (II) period. In other words, power loss, heat generation and magnetic noise, which accompany the activation of the transformer of the charging circuit 40, can be reduced to a minimum.

Since the unchanged output of the AC adaptor 10 is used for quick charging at the initial charging stage, and since a charge current value can be increased, the total charging period can be reduced.

As is described above, according to the present invention, it is possible to provide, for an electronic apparatus that can employ such a constant voltage rechargeable battery as c lithium ion battery, a power supply unit that can reduce power loss, and the heat and magnetic noise generated in the electronic apparatus.

More specifically, the power supply unit of the present invention does not employ a charging circuit at the initial charging stage. That is, since a transformer in the charging circuit is not activated at the initial charging stage, a power loss, accompanied by the operation of the transformer, and heat generation and the occurrence of magnetic noise in the electronic apparatus can be reduced to the minimum.

Further, since the output of the AC adaptor 10 is used unchanged for quick charging at the initial charging stage, and a charging current value can be increased, the total charging period can be reduced.

While the invention has been particularly shown and described with respect to preferred embodiments thereof, it should be understood by those skilled in the art that the foregoing and other changes in form and detail may be made therein without departing from the spirit and scope of the invention as defined in the appended claims. For example, the present invention can be applied to various battery operated electric/electronic apparatuses, such as portable radio terminals, cordless telephones, electronic notebooks and video cameras.

What is claimed is:

1. A power supply unit, for an electronic apparatus driven by a rechargeable battery, comprising:
    an external power input circuit for receiving power supplied by an external power source;
    a DC/DC converter for transforming a voltage received in parallel from said external power input circuit and said rechargeable battery, and for supplying a resultant voltage to respective sections of said electronic apparatus;
    a charging circuit for so adjusting an output of said external power input circuit such that said output is appropriate for charging said rechargeable battery; and
    charge control means for, in response to a terminal voltage of said rechargeable battery having attained a predetermined value while said battery is being charged, actuating operation of said charging circuit.

2. The power supply unit of claim 1, wherein said charging circuit is operative to provide constant voltage control for an output of said external power input circuit and for supplying a resultant output to said rechargeable battery.

3. The power supply unit of claim 2, wherein:
    said external power input circuit is an AC adaptor for transforming an external AC voltage into a DC voltage and for transmitting said DC voltage, and
    said power supply unit further includes voltage measurement means for measuring a terminal voltage of said rechargeable battery while said rechargeable battery is being charged.

4. The power supply unit of claim 3, wherein said AC adaptor has a constant current output characteristic and an output current does not exceed a predetermined value, or a constant wattage output characteristic and an output wattage does not exceed a predetermined value.

5. A power supply unit, for an electronic apparatus driven by a rechargeable battery, comprising:
    (a) an AC adaptor for transforming an external AC voltage into a DC voltage and for transmitting said DC voltage;
    (b) a DC/DC converter for transforming a voltage received in parallel from said AC adaptor and said rechargeable battery, and for supplying a resultant voltage to respective sections of said electronic apparatus;
    (c) a charging circuit for providing constant voltage control for an output of said AC adaptor and for supplying a resultant output to said rechargeable battery;
    (d) voltage measurement means for measuring a terminal voltage of said rechargeable battery while said battery is being charged;
    (e) a first power line for connecting said AC adaptor and said rechargeable battery;
    (f) a switch inserted in series along said first power line;
    (g) a second power line for connecting, via said charging circuit, said AC adaptor and said rechargeable battery; and (h) charging control means for turning on said switch and halting operation of said charging circuit at an initial charging stage whereat said terminal voltage is less than a predetermined value, and for turning off said switch and actuating said operation of said charging circuit at a charging end stage whereat said terminal voltage has attained said predetermined value.

6. The power supply unit of claim 5, wherein said AC adaptor has a constant current output characteristic and an output current does not exceed a predetermined value, or a constant wattage output characteristic and an output wattage does not exceed a predetermined value.

7. An electronic apparatus driven by a rechargeable battery, comprising:

an external power input circuit for receiving power supplied by an external power source;

a DC/DC converter for transforming a voltage received in parallel from said external power input circuit and said rechargeable battery;

a charging circuit for so adjusting an output of said external power input circuit such that said output is appropriate for charging said rechargeable battery;

charge control means for, in response to a terminal voltage of said rechargeable battery having reached a predetermined value while said battery is being charged, actuating operation of said charging circuit; and a system load to be driven by an output of said DC/DC converter.

8. The electronic apparatus of claim 7, wherein said charging circuit is operative to provide constant voltage control for an output of said external power input circuit and for supplying a resultant output to said rechargeable battery.

9. The electronic apparatus of claim 8, wherein:

said external power input circuit is an AC adaptor for transforming an external AC voltage into a DC voltage and for transmitting said DC voltage, and said electronic apparatus further includes a voltage measurement means for measuring a terminal voltage of said rechargeable battery while said battery is being charged.

10. The electronic apparatus of claim 9, wherein said AC adaptor has a constant current output characteristic and an output current does not exceed a predetermined value, or a constant wattage output characteristic and an output wattage does not exceed a predetermined value.

11. The electronic apparatus of claim 8, further comprising a power jack for attaching said AC adaptor to said electronic apparatus.

12. The electronic apparatus of claim 11, wherein said AC adaptor has a constant current output characteristic and an output current does not exceed a predetermined value, or a constant wattage output characteristic and an output wattage does not exceed a predetermined value.

13. An electronic apparatus driven by a rechargeable battery comprising:

(a) an AC adaptor for transforming an external AC voltage into a DC voltage and for transmitting said DC voltage;

(b) a DC/DC converter for transforming a voltage received in parallel from said AC adaptor and said rechargeable battery;

(c) a charging circuit for providing constant voltage control for an output of said AC adaptor and for supplying a resultant output to said rechargeable battery;

(d) voltage measurement means for measuring a terminal voltage of said rechargeable battery while said battery is being charged;

(e) a first power line for connecting said AC adaptor and said rechargeable battery;

(f) a switch inserted in series along said first power line;

(g) a second power line for connecting, via said charging circuit, said AC adaptor and said rechargeable battery;

(h) charging control means for turning on said switch and halting operation of said charging circuit at an initial charging stage whereat said terminal voltage is less than a predetermined value, and for turning off said switch and actuating said operation of said charging circuit at a charging end stage whereat said terminal voltage has attained said predetermined value; and (i) a system load to be driven by an output of said DC/DC converter.

14. The electronic apparatus of claim 13, wherein said AC adaptor has a constant current output characteristic and an output current does not exceed a predetermined value, or a constant wattage output characteristic and an output wattage does not exceed a predetermined value.

* * * * *